(12) United States Patent
Hamada et al.

(10) Patent No.: US 6,224,639 B1
(45) Date of Patent: May 1, 2001

(54) METHOD OF PRODUCING ELECTROLYTIC CAPACITOR

(75) Inventors: Takahiro Hamada, Yao; Emiko Igaki, Amagasaki; Masakazu Tanahashi, Osaka; Yasunobu Tsuji, Kawanishi; Chiharu Hayashi, Hirakata; Yoshihiko Tsujikawa, Joyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/348,757

(22) Filed: Jul. 7, 1999

(30) Foreign Application Priority Data

Jul. 7, 1998 (JP) ................................... 10-191416

(51) Int. Cl.$^7$ .................................................. H01G 9/025
(52) U.S. Cl. ......................................... 29/25.03; 361/525
(58) Field of Search ........................ 29/25.03; 361/525, 361/523, 508, 524, 528, 529

(56) References Cited

U.S. PATENT DOCUMENTS

| | | | |
|---|---|---|---|
| 4,697,001 | 9/1987 | Walker et al. | 528/423 |
| 4,780,796 | * 10/1988 | Fukuda et al. | 361/433 |
| 5,428,500 | * 6/1995 | Nishiyama et al. | 361/525 |
| 5,457,862 | * 10/1995 | Sakata et al. | 29/25.03 |
| 5,461,537 | * 10/1995 | Kobayashi et al. | 361/525 |
| 5,473,503 | * 12/1995 | Sakata et al. | 361/525 |
| 6,110,234 | * 8/2000 | Sakata et al. | 29/25.03 |

* cited by examiner

*Primary Examiner*—Michael Trinh
(74) *Attorney, Agent, or Firm*—Wenderoth, Lind & Ponack, L.L.P.

(57) ABSTRACT

The present invention provides a method of producing an electrolytic capacitor including a porous anode and a solid electrolyte made of a conductive polymer, which can improve coating properties of the conductive polymer on an external surface of the porous anode and productivity. By controlling a polymerization rate, it is possible to sufficiently coat the external surface of the porous anode and fill inner spaces of a lot of pores of the porous anode with the conductive polymer with less numbers of polymerization in comparison with a method of the prior art, thereby obtaining an electrolytic capacitor with small leak current and high reliability.

9 Claims, 1 Drawing Sheet

METHOD OF PRODUCING ELECTROLYTIC CAPACITOR

BACKGROUND OF THE INVENTION

1. Field of the Invention

The present invention relates to a method of producing an electrolytic capacitor using a valve metal such as aluminum, tantalum or the like and, more particularly, to a method of producing an electrolytic capacitor using a conductive polymer as a solid electrolyte.

2. Description of the Related Art

As a method of producing a conductive polymer to be turned into a solid electrolyte of an electrolytic capacitor by chemical oxidation polymerization, for example, a one-fluid method has hitherto been used. The one-fluid method introduces a mixed solution containing of a monomer to be turned into a conductive polymer by polymerization (hereinafter abbreviated to a "monomer solution") and an oxidizing agent capable of polymerizing the monomer by oxidation (hereinafter abbreviated to an "oxidizing agent solution") on a surface oxide layer of a porous valve metal to be turned into a capacitor, thereby to form a conductive polymer.

In the one-fluid method, however, the reaction is initiated immediately after the monomer and oxidizing agent were mixed and, in the case of a porous body having complicated pores such as tantalum sintered body, the reaction solution is deactivated before arriving the deep portion of pores and a conductive polymer is not formed at the center portion of a sintered body. As disclosed in Japanese Laid-open Patent Publication No. 6-310380, there is a method of introducing a mixed solution of a monomer and an oxidizing agent on an oxide layer of a porous body at low temperature and raising the temperature of the porous anode or mixed solution, thereby to make the amount of a conductive polymer formed at the center portion of the porous anode equal to the amount formed at the periphery of the surface. In the one-fluid method, however, since the polymerization reaction can not be completely terminated even when mixing the monomer solution with the oxidizing agent solution at low temperature, consumption of the monomer and oxidizing agent becomes larger.

Even when the monomer solution and oxidizing agent solution can be cooled to an ultra-low temperature and the polymerization reaction can be drastically inhibited, the cost of the production unit and running cost increase, which is uneconomical.

Accordingly, as disclosed in U.S. Pat. No. 4,697,001, there is generally used a two-fluid method of alternatively dipping a porous body to be turned into a capacitor in a monomer solution and an oxidizing agent solution without mixing the monomer solution and the oxidizing agent solution, that is, bringing the porous anode whose pores are impregnated with one of the monomer solution and oxidizing agent solution into contact with the other, thereby to form a conductive polymer in the inner spaces of the pores by polymerization.

However, when the porous anode impregnated with one solution among two solutions of the monomer solution and oxidizing agent solution is dipped in the other solution, the solution, with which the porous anode was impregnated, momentarily diffuses into the other solution on the external surface of the porous anode. Therefore, the conductive polymer is not easily adhered and formed on the external surface of the porous anode in comparison with the inner spaces of a lot of pores of the porous anode. When the external surface of the porous anode is not completely coated with the conductive polymer, a dielectric layer on the external surface is deteriorated by stress, resulting in large leak current. Therefore, a conductive polymer forming step must be repeated many times so as to obtain a capacitor with complete intrinsic capacity and small leak current by completely coating the dielectric layer formed on the internal surfaces of a lot of the pores and the external surface of the porous anode with the conductive polymer.

SUMMARY OF THE INVENTION

That is, an object of the present invention is to provide a method of producing an electrolytic capacitor with small leak current and high reliability, which can reduce the number of steps of forming a conductive polymer, thereby to improve the productivity.

The present invention provides a method of producing an electrolytic capacitor including a porous anode and a solid electrolyte made of a conductive polymer. The porous anode further includes a porous body and a dielectric layer, and the dielectric layer is formed on internal surfaces of a lot of pores of the porous body and an external surface of the porous body. The conductive polymer is formed on the surface of the dielectric layer by a chemical oxidation polymerization method with a monomer and an oxidizing agent.

According to a first aspect of the invention, the method of the present invention includes the step of forming a first conductive polymer portion in inner spaces of a lot of pores of the porous anode and the step of forming a second conductive polymer portion on the external surface of the porous anode, and a polymerization rate of the monomer in the step of forming the second conductive polymer portion is larger than that of the monomer in the step of forming the first conductive polymer portion.

Comparing the case of high polymerization rate of a monomer with the case of low polymerization rate of a monomer, in the case of high polymerization rate, the proportion of the amount of the conductive polymer formed on the external surface of the porous anode to the total amount of the conductive polymer becomes higher than in the case of low polymerization rate. Accordingly, by controlling the polymerization rate, it is possible to easily fill the inner spaces of a lot of the pores of the porous anode and coat the external surface of the porous anode with the conductive polymer in a separate step and the step of forming a conductive polymer can be composed of the first and second steps described above. Particularly, since the conductive polymer is preferentially formed on the external surface by making the polymerization rate in the step of forming the second conductive polymer portion larger than that in the step of forming the first conductive polymer portion, the number of polymerization of the conductive polymer can be more reduced than usual. Furthermore, the separate step makes it possible to completely fill the inner spaces of the pores of the porous anode and coat the external surface with the conductive polymer.

In the production method described above, the first conductive polymer is preferably formed after forming the second conductive polymer portion. As a result, coating properties on the external surface of the porous anode are improved, thereby making it possible to reduce the number of polymerization for forming the conductive polymer on the external surface of the porous anode.

In the production method described above, it is preferred that the first conductive polymer portion forming step is composed of two stages and the amount of the conductive polymer to be formed in the first stage is not more than 50% by volume of the amount of the conductive polymer to be formed in the whole pores, and that the second conductive polymer portion is subsequently formed and, furthermore, the rest of the first conductive polymer portion is formed in the pores in the second stage.

When coating the external surface of the porous anode with the conductive polymer after completely filling the inner spaces of the pores of the porous anode with the conductive polymer, since the pore portion of the porous anode contains a small number of voids into which the monomer solution or oxidizing agent solution penetrates, the amount of the monomer or oxidizing agent for previous impregnation is reduced. Therefore, the amount of the conductive polymer to be formed per one time is small and a large number of polymerization must be required. On the other hand, since the amount of the solution to be retained is large and the amount of the conductive polymer to be formed is also increased before completely filling the inner spaces of the pores of the porous anode with the conductive polymer, coating on the external surface can be attained more easily when the step of forming the second conductive polymer is provided before or during the inner spaces of the pores are filled with the conductive polymer.

In the production method described above, the polymerization rate of the monomer in the step of forming the second conductive polymer portion is preferably made higher than that of the monomer in step of forming the first conductive polymer portion by making the concentration of the oxidizing agent in the step of forming the second conductive polymer portion higher than that of the oxidizing agent in the step of forming the first conductive polymer portion, or by making the concentration of the monomer in the step of forming the second conductive polymer portion higher than that of monomer in the step of forming the first conductive polymer portion, or by making the polymerization temperature in the step of forming the second conductive polymer portion higher than that of the temperature in the step of forming the first conductive polymer portion.

In the production method described above, the polymerization rate of the monomer on forming the second conductive polymer portion is preferably 2–12 times the polymerization rate of the monomer on forming the first conductive polymer portion.

In the production method described above, the step of forming the first and/or second conductive polymer portion further includes the steps of (a) dipping the porous anode in one of the monomer solution and oxidizing agent solution, (b) dipping the porous anode in the other solution for a predetermined time and (c) pulling up the porous anode from the solution and allowing the porous anode to stand outside the solution for a predetermined time.

When the first and second conductive polymer portion are formed by allowing the porous anode to stand outside the solution for a predetermined time, it is possible to prevent one of the monomer solution and the oxidizing agent solution introduced previously in the porous anode from flowing and diffusing into the other solution to be subsequently introduced. Therefore, the number of polymerization for formation of the first and second polymer portions can be reduced.

In addition, the electrolytic capacitor according to the present invention includes a porous anode and a solid electrolyte made of a conductive polymer. The porous anode further includes a porous body made of a valve metal and a dielectric layer made of an oxide of the valve metal. The conductive polymer is formed on the dielectric layer in two steps at different polymerization rates.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals.

DESCRIPTION OF THE PREFERRED EMBODIMENTS

Figure 1:
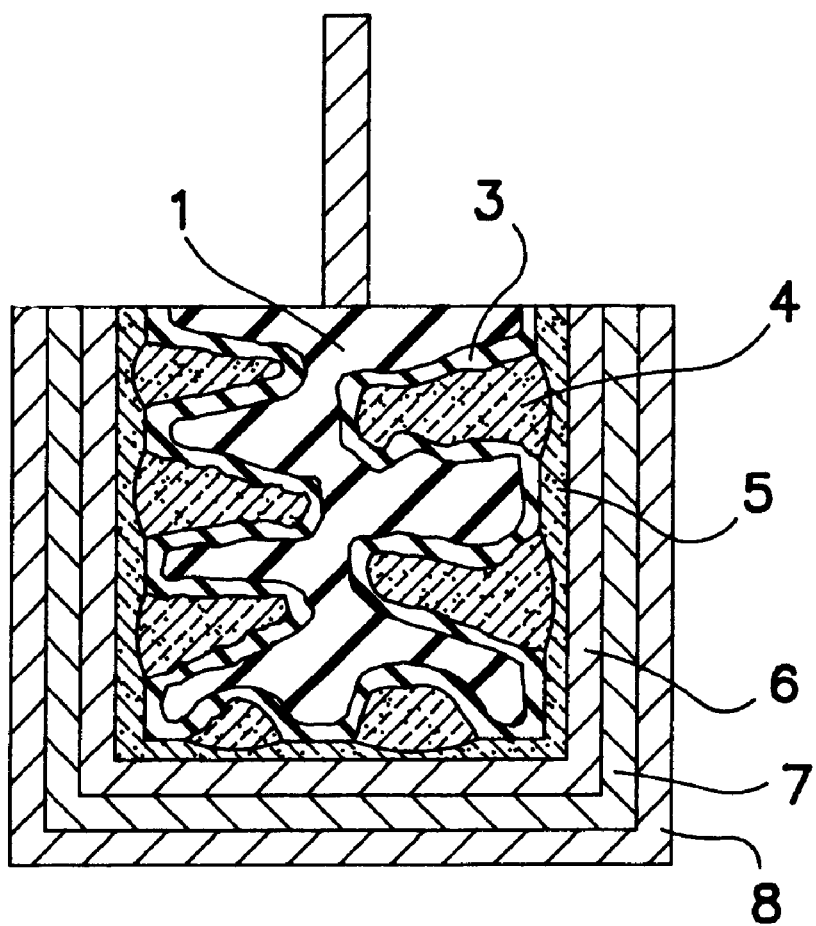
FIG. 1 is a schematic sectional view showing a configuration of the electrolytic capacitor of the embodiment according to the present invention.

This application is based on application No. 10-191416 filed Jul. 7, 1998 in Japan, the content of which is incorporated hereinto by reference. The embodiments of the present invention will be described below.

Embodiment 1

FIG. 1 is a schematic sectional view showing a configuration of the electrolytic capacitor obtained in the first embodiment according to the present invention. A first conductive polymer portion 4 is formed in inner spaces of a lot of pores through a dielectric layer 3 on the surface of an anode 1, while a second conductive polymer portion 5 is formed on the external surface thereof. Outside of the second conductive polymer portion, a carbon paint film 6 and a silver paint film 7 are formed and a cathode lead plate 8 is provided through the silver paint film.

In this first embodiment, the first conductive polymer portion is formed after forming the second conductive polymer portion. In the step of forming the second conductive polymer portion, by repeating a process of alternatively dipping the anode 1, wherein the dielectric layer 3 is formed on the surface by a forming treatment, in a monomer solution and an oxidizing agent solution predetermined times. The monomer is polymerized on dipping in the solution and the external surface of the porous anode is coated with the conductive polymer, thereby to form the second conductive polymer portion 5. The oxidizing solution used for forming the second conductive polymer portion is prepared in such a manner that the concentration of the oxidizing agent is higher than that in case of forming the first conductive polymer portion described below and the polymerization rate is increased, whereby the external surface of the porous anode is preferentially coated with the conductive polymer. Subsequently, in the step of forming the first conductive polymer portion, by repeating a process of alternatively dipping the resultant in the monomer solution and oxidizing agent solution predetermined times, the monomer is polymerized on dipping in the solution, thereby to form the first conductive polymer portion 4 in the inner spaces of the pores and to continuously integrate with the second conductive polymer portion 5 at the upper surface of the pores.

As described above, according to the first embodiment, the conductive polymer is preferentially formed on the external surface of the porous anode by composing the step of forming the conductive polymer of the steps of forming the first and second conductive polymer portions and making the polymerization rate on forming the second conductive polymer portion larger than that on forming the first conductive polymer portion. Therefore, coating properties on the external surface of the porous anode are improved, thereby making it possible to completely coat the external surface of the porous anode with the conductive polymer with less numbers than usual.

The anode used in the first embodiment of the present invention has a lot of voids and pores in communication with the external surface of the valve metal, and the surface area thereof is markedly enlarged. For example, aluminum, tantalum or the like may be preferably used.

The monomer used in the first embodiment of the present invention is selected from those wherein its polymer exhibits conductivity. For example, heterocylic five-membered ring compounds such as pyrrole, thiophene, 3-alkylthiophene, isothianaphthene or the like can be preferably used.

As the oxidizing agent, for example, there can be preferably used ferric salt (e.g. ferric sulfate, ferric chloride, etc.), persulfate (e.g. ammonium persulfate, etc.), permanganate and hydrogen peroxide.

A dopant is added to the monomer solution and or the oxidizing agent solution so as to further enhance the conductivity of the conductive polymer. For the conductive polymer described above, arylsulfonic ion and arylphosphoric ion of an alkylnaphthalenesulfonic acid can be used. It is preferred to add it in the solution in the form of a Na salt and an alkali salt.

With respect to control of the polymerization rate, the polymerization rate of the monomer can be increased by increasing the concentration of the monomer or oxidizing agent, or increasing the temperature of the monomer solution and oxidizing agent solution, or changing the amount of the alcohol and dopant used as the solvent. The polymerization rate in the case of forming the second conductive polymer portion is preferably 2–12 times, and more preferably 3–10 times the polymerization rate in the case of forming the first conductive polymer portion.

For example, when using ferric sulfate as the oxidizing agent, the concentration of the oxidizing agent on forming the second conductive polymer portion is preferably made larger than that on forming the first conductive polymer portion within a range from 0.1 to 5 mol/l. In addition, the temperature of the monomer solution and oxidizing agent solution on forming the second conductive polymer portion is preferably made higher than that on forming the first conductive polymer portion within a range from 10 to 40 degrees.

As the polymerization rate in the present invention, those measured and calculated by the following procedure described below were used. That is, a monomer solution and an oxidizing agent solution at a fixed temperature are prepared, and then the monomer solution and oxidizing agent solution are mixed so that an oxidizing agent is present in excess based on a monomer. After the mixture is sufficiently stirred and allowed to stand at a predetermined temperature for a fixed time, the formed polymer is recovered and the weight is measured. The reacting number of moles of the monomer is calculated from the weight of the recovered polymer. The reaction order and reaction rate coefficient were determined by performing such a procedure at various initial oxidizing agent concentrations, thereby to calculate a polymerization rate.

Embodiment 2

In this embodiment, the production method is the same as that in the first embodiment, except that the step of forming the first conductive polymer portion is composed of two stages. First, in the step of forming the first conductive polymer portion as the first stage, by repeating a process of alternatively dipping the anode 1, wherein the dielectric layer 3 is formed on the surface by a forming treatment, in a monomer solution and an oxidizing agent solution predetermined times, the polymer is polymerized on dipping in the solution and the inner spaces of the pores are filled with the conductive polymer in the amount of not more than 50% by volume based on the total conductive polymer formed. Then, in the step of forming the second conductive polymer portion, by repeating a process of alternatively dipping in the monomer solution and oxidizing agent solution predetermined times, the monomer is polymerized on dipping in the solution and the external surface is coated with the conductive polymer, thereby to form the second conductive polymer portion 5. The oxidizing solution used for forming the second conductive polymer portion is prepared in such a manner that the concentration of the oxidizing agent is higher than that in case of forming the first conductive polymer portion and the polymerization rate is increased. Subsequently, in the second stage of the step of forming the first conductive polymer portion, by repeating a process of alternatively dipping the resultant in the monomer solution and oxidizing agent solution used in the first stage predetermined times, the rest of the inner spaces of the pores are filled with the conductive polymer, thereby to form the first conductive polymer portion 4 and to continuously integrate with the second conductive polymer portion 5 at the upper surface of the pores.

As described above, according to the second embodiment, when the inner spaces of the pores of the porous anode are not completely filled with the conductive polymer on forming the first conductive polymer portion, thereby making it possible to increase the amount of the solution to be held in voids of the porous anode and to increase the amount of the conductive polymer formed, resulting in easy formation of the conductive polymer on the external surface of the porous anode. Therefore, coating properties on the external surface of the porous anode and the number of polymerization for forming the second conductive polymer portion can be reduced. Particularly in the porous anode having pores with small diameter, when a part of the conductive polymer portion is formed first in the inner spaces of the pores, and then the second conductive polymer portion is formed and the rest of the first conductive polymer portion is then formed, the conductive polymer can be efficiently formed on the external surface of the porous anode and the inner spaces of the pores can be filled with the conductive polymer easily.

As a result of the present inventors' study, comparing the case where the second conductive polymer portion is provided when the proportion of the conductive polymer portion in the pores is 50% based on the total volume of the conductive polymer filled in the inner spaces of the pores with the case where the second conductive polymer portion is provided when the proportion of the conductive polymer portion in the inner spaces of the pores is 80%, the number of forming the second conductive polymer portion could be reduced by about 50% in the case where the proportion is 50%.

In the case where the second conductive polymer portion is provided when the proportion of the conductive polymer portion in the inner spaces of the pores is smaller than 50% based on the total volume of the conductive polymer filled finally in the inner spaces of the pores, coating properties of the conductive polymer on the external surface of the porous anode is not markedly improved when the polymerization rate on forming the second conductive polymer portion is two times smaller than that on forming the first conductive polymer portion. When the polymerization rate on forming the second conductive polymer portion is twelve times larger than that on forming the first conductive polymer portion, since the conductive polymer layer to be formed is liable to be come off from the porous anode, the polymerization rate is preferably 2–12 times, and more preferably 3–10 times.

Embodiment 3

In this embodiment, the production method is the same as that in the first embodiment, except that, after forming the second conductive polymer portion, the porous anode is dipped in one of the monomer solution and oxidizing agent solution, dipped in the other solution, pulled up from the solution and is allowed to stand outside the solution to form the first conductive polymer portion. That is, the first conductive portion is formed by (a) dipping the porous anode in one of the monomer solution and oxidizing agent solution at low temperature, (b) dipping in the other solution, (c) pulling up the porous anode from the solution and allowing it to stand outside the solution.

When the monomer solution and oxidizing agent solution are an aqueous solution, the low temperature is preferably from 0 to 10° C. The porous anode may also be allowed to stand at high temperature after repeating the operations of (b) and (c) one or more times.

As described above, according to the third embodiment, it is possible to inhibit one of the monomer solution and the oxidizing agent solution introduced previously from diffusing into the other solution to be subsequently introduced in the porous anode, by pulling up the porous anode from the solution and allowing the porous anode to stand outside the solution for a predetermined time. Since the reaction rate can be inhibited by introducing the monomer solution and oxidizing agent solution at low temperature, the oxidizing agent solution or monomer solution sufficiently diffuses into the inner spaces of the pores and then polymerized. Therefore, the inner spaces of the pores can be sufficiently filled with the conductive polymer and the number of polymerization for forming the first conductive polymer portion can be reduced. Furthermore, since the second conductive polymer portion is previously formed, coating properties on the external surface of the porous anode are sufficiently secured.

Embodiment 4

In this embodiment, the production method is the same as that in the second embodiment, except that each stage of forming the first conductive polymer portion composed of two stages is conducted in the same manner as in the step of forming the first conductive polymer portion in the third embodiment.

As described above, according to the fourth embodiment, it is possible to obtain the same effect as that of the second embodiment and to inhibit one of the monomer solution and the oxidizing agent solution introduced previously in the porous anode from diffusing into the other solution to be subsequently introduced, by pulling up the porous anode from the solution and allowing the porous anode to stand outside the solution for a predetermined time in the formation of the first conductive polymer portion. Since the reaction rate can be inhibited by introducing the monomer solution and oxidizing agent solution at low temperature, the oxidizing agent solution or monomer solution sufficiently diffuses into the inner spaces of the pores and then polymerized. Therefore, the inner spaces of the pores can be sufficiently filled with the conductive polymer and there can be obtained the effect capable of forming the first conductive polymer portion with less number of polymerization.

Embodiment 5

In this embodiment, the production method is the same as that in the third embodiment, except that, in the third embodiment, the step of forming the second conductive polymer portion includes the processes of (a) dipping the porous anode in one of the monomer solution and oxidizing agent solution, (b) dipping the porous anode in the other solution for a predetermined time and (c) pulling up the porous anode from the solution and allowing the porous anode to stand outside the solution for a predetermined time.

The porous anode may also be allowed to stand at high temperature after repeating the operations of (b) and (c) one or more times.

As described above, according to the fifth embodiment, it is possible to obtain the same effect as that of the third embodiment and to inhibit one of the monomer solution and the oxidizing agent solution introduced previously in the porous anode from diffusing into the other solution to be introduced subsequently, by pulling up the porous anode from the solution and allowing the porous anode to stand outside the solution for a predetermined time in the formation of the second conductive polymer portion. Therefore, there can be obtained the effect capable of forming the second conductive polymer portion with less number of polymerization.

Embodiment 6

In this embodiment, the production method is the same as that in the fourth embodiment, except that, in the fourth embodiment, the step of forming the second conductive polymer portion is conducted in the same manner as in the step of forming the second conductive polymer portion in the fifth embodiment.

As described above, according to the sixth embodiment, it is possible to obtain the same effect as that of the fourth embodiment and to inhibit one of the monomer solution and the oxidizing agent solution introduced previously in the porous anode from diffusing into the solution to be introduced subsequently, by pulling up the porous anode from the solution and allowing the porous anode to stand outside the solution for a predetermined time in the formation of the second conductive polymer portion. Therefore, there can be obtained the effect capable of forming the second conductive polymer portion with less number of polymerization.

The following Examples further illustrate the present invention in detail but present invention may be practiced in still other ways without departing from the spirit or essential character thereof.

A monomer solution was prepared by dissolving pyrrole (concentration: 1.0 mol/l) in an aqueous solution containing 10% by volume of isopropyl alcohol.

An oxidizing agent solution 1 was prepared by dissolving 0.25 mol/l A of ferric sulfate as an oxidizing agent and 0.03 mol/l an alkylnaphthalenesulfonic ion as a dopant in the form of a Na salt in an aqueous solution containing 10% by volume of isopropyl alcohol. In addition, an oxidizing agent solution 2 was prepared by dissolving 2.5 mol/l of ferric sulfate as an oxidizing agent and 0.03 mol/l an alkylnaphthalenesulfonic ion as a dopant in the form of a Na salt in an aqueous solution containing 10% by volume of isopropyl alcohol. Furthermore, an oxidizing agent solution 3 was prepared by dissolving 0.75 mol/l of ferric sulfate as an oxidizing agent and 0.03 mol/l an alkylnaphthalenesulfonic ion as a dopant in the form of a Na salt in an aqueous solution containing 10% by volume of isopropyl alcohol.

A tantalum powder was compressed, together with a lead, and then calcined to form a porous body in size of 1.4 mm×3.0 mm×3.8 cm. Then, the void surface and external surface of the tantalum porous body were formed at a formation voltage of 20 V to form an oxide layer dielectric layer, thereby obtaining a porous body for capacitor.

On the dielectric layer of the prepared porous body for capacitor, a conductive polymer layer was formed as a cathode by the following chemical oxidation polymerization method. Furthermore, a lead plate as a current collecting material of the cathode was provided on the exterior surface to form an electrolytic capacitor. Then, an electrostatic capacity at 120 Hz and 100 kHz and a leak current were measured.

The data in the following Examples and Comparative Examples show an average value of ten capacitors and the leak current is a current value at 10 V after 3 minutes. In Table 1 below, the capacity at 120 Hz and 100 kHz of the electrolytic capacitor, leak current, and number of repetitions of the steps of forming the first and second conductive polymer portions are shown.

EXAMPLE 1

With maintaining a monomer solution and an oxidizing agent solution 1 at 25° C., a metal porous body was dipped in the monomer solution, pulled up after 7 minutes, dipped immediately in the oxidizing agent solution 1, allowed to stand at 15 minutes, washed and then dried. The above operation was repeated ten times to form a first conductive polymer portion. Then, with maintaining a monomer solution and an oxidizing agent solution 2 at 25° C., the metal porous body was dipped in the monomer solution, pulled up after 7 minutes, dipped immediately in the oxidizing agent solution 2, allowed to stand at 15 minutes, washed and then dried. The above operation was repeated ten times to form a second conductive polymer portion. At this time, a rate of the reaction between the monomer and oxidizing agent in the case where the second conductive polymer portion is formed is about ten times a rate of the reaction between the monomer and oxidizing agent in the case where the first conductive polymer portion is formed.

A capacity at 120 Hz of the resulting capacitor is 148 $\mu$F, a capacity attaining percentage was 92.5%, a capacity at 100 kHz was 88 $\mu$F, and a leak current was 0.113 $\mu$F.

EXAMPLE 2

With maintaining a monomer solution and an oxidizing agent solution 1 at 25° C., a metal porous body was dipped in the monomer solution, pulled up after 7 minutes, dipped immediately in the oxidizing agent solution 1, allowed to stand at 15 minutes, washed and then dried. The above operation was repeated five times to form a first conductive polymer portion. Then, with maintaining a monomer solution and an oxidizing agent solution 2 at 25° C., the metal porous body was dipped in the monomer solution, pulled up after 7 minutes, dipped immediately in the oxidizing agent solution 2, allowed to stand at 15 minutes, washed and then dried. The above operation was repeated five times to form a second conductive polymer portion. Furthermore, with maintaining the monomer solution and oxidizing agent solution 1 at 25° C., the metal porous body was dipped in the monomer solution, pulled up after 7 minutes, dipped immediately in the oxidizing agent solution 1, allowed to stand at 15 minutes, washed and then dried. The above operation was repeated five times to form the remaining first conductive polymer portion.

At this time, a rate of the reaction between the monomer and oxidizing agent in the case where the second conductive polymer portion is formed is about ten times a rate of the reaction between the monomer and oxidizing agent in the case where the first conductive polymer portion is formed.

A capacity at 120 Hz of the resulting capacitor is 150 $\mu$F, a capacity attaining percentage was 93.8%, a capacity at 100 kHz was 89 $\mu$F, and a leak current was 0.108 $\mu$F.

EXAMPLE 3

With maintaining a monomer solution and an oxidizing agent solution 2 at 25° C., a metal porous body was dipped in the monomer solution, pulled up after 7 minutes, dipped immediately in the oxidizing agent solution 2, allowed to stand at 15 minutes, washed and then dried. The above operation was repeated five times to form a second conductive polymer portion. Then, with maintaining a monomer solution and an oxidizing agent solution 1 at 25° C., the metal porous body was dipped in the monomer solution, pulled up after 7 minutes, dipped immediately in the oxidizing agent solution 1, allowed to stand at 15 minutes, washed and then dried. The above operation was repeated ten times to form a first conductive polymer portion. At this time, a rate of the reaction between the monomer and oxidizing agent in the case where the second conductive polymer portion is formed is about ten times a rate of the reaction between the monomer and oxidizing agent in the case where the first conductive polymer portion is formed.

A capacity at 120 Hz of the resulting capacitor is 152 $\mu$F, a capacity attaining percentage was 95.0%, a capacity at 100 kHz was 91 $\mu$F, and a leak current was 0.081 $\mu$F.

EXAMPLE 4

With maintaining a monomer solution and an oxidizing agent solution 2 at 50° C., a metal porous body was dipped in the monomer solution, pulled up after 7 minutes, dipped immediately in the oxidizing agent solution 2, allowed to stand at 15 minutes, washed and then dried. The above operation was repeated five times to form a second conductive polymer portion. Then, with maintaining a monomer solution and an oxidizing agent solution 1 at 25° C., the metal porous body was dipped in the monomer solution, pulled up after 7 minutes, dipped immediately in the oxidizing agent solution 1, allowed to stand at 15 minutes, washed and then dried. The above operation was repeated ten times to form a first conductive polymer portion. At this time, a rate of the reaction between the monomer and oxidizing agent in the case where the second conductive polymer portion is formed is about four times a rate of the reaction between the monomer and oxidizing agent in the case where the first conductive polymer portion is formed.

A capacity at 120 Hz of the resulting capacitor is 150 $\mu$F, a capacity attaining percentage was 93.8%, a capacity at 100 kHz was 90 $\mu$F, and a leak current was 0.092 $\mu$F.

Comparative Example 1

With maintaining a monomer solution and an oxidizing agent solution 1 at 25° C., a metal porous body was dipped in the monomer solution, pulled up after 7 minutes, dipped immediately in the oxidizing agent solution 1, allowed to stand at 15 minutes, washed and then dried. The above operation was repeated twenty times to form a conductive polymer portion.

A capacity at 120 Hz of the resulting capacitor is 135 µF, a capacity attaining percentage was 84.4%, a capacity at 100 kHz was 81 µF, and a leak current was 15.8 µF.

Comparative Example 2

With maintaining a monomer solution and an oxidizing agent solution 1 at 25° C., a metal porous body was dipped in the monomer solution, pulled up after 7 minutes, dipped immediately in the oxidizing agent solution 1, allowed to stand at 15 minutes, washed and then dried. The above operation was repeated forty times to form a conductive polymer portion.

A capacity at 120 Hz of the resulting capacitor is 150 µF, a capacity attaining percentage was 93.8%, a capacity at 100 kHz was 88 µF, and a leak current was 0.26 µF.

EXAMPLE 5

With maintaining a monomer solution and an oxidizing agent solution 3 at 5° C., a metal porous body was dipped in the monomer solution and pulled up after 7 minutes. Then, an operation of dipping in the oxidizing agent solution 3, pulling up after 10 seconds and allowing to stand in a refrigerator at 5° C. for 5 minutes was repeated four times. The porous anode was put in a drier at 45° C. for 10 minutes and, after the completion of the reaction between the monomer and oxidizing agent, the resultant was washed and dried. The above operation was repeated five times to form a first conductive polymer portion.

Then, with maintaining a monomer solution and an oxidizing agent solution 2 at 25° C., the metal porous body was dipped immediately in the oxidizing agent solution 2, washed and then dried. The above operation was repeated ten times to form a first conductive polymer portion. At this time, a rate of the reaction between the monomer and oxidizing agent in the case where the second conductive polymer portion is formed is about eleven times a rate of the reaction between the monomer and oxidizing agent in the case where the first conductive polymer portion is formed.

A capacity at 120 Hz of the resulting capacitor is 152 µF, a capacity attaining percentage was 95.0%, a capacity at 100 kHz was 120 µF, and a leak current was 1.78 µF.

EXAMPLE 6

With maintaining a monomer solution and an oxidizing agent solution 2 at 25° C., a metal porous body was dipped in the monomer solution, pulled up after 7 minutes, dipped immediately in the oxidizing agent solution 2, allowed to stand at 15 minutes, washed and then dried. The above operation was repeated five times to form a second conductive polymer portion. Then, with maintaining a monomer solution and an oxidizing agent solution 3 at 5° C., the metal porous body was dipped in the monomer solution and pulled up after 7 minutes. Then, an operation of dipping in the oxidizing agent solution 3, pulling up after 10 seconds and allowing to stand in a refrigerator at 5° C. for 5 minutes was repeated four times. The porous anode was put in a drier at 45° C. for 10 minutes and, after the completion of the reaction between the monomer and oxidizing agent, the resultant was washed and dried. The above operation was repeated five times to form a first conductive polymer portion. At this time, a rate of the reaction between the monomer and oxidizing agent in the case where the second conductive polymer portion is formed is about eleven times a rate of the reaction between the monomer and oxidizing agent in the case where the first conductive polymer portion is formed.

A capacity at 120 Hz of the resulting capacitor is 153 µF, a capacity attaining percentage was 95.6%, a capacity at 100 kHz was 122 µF, and a leak current was 0.095 µF.

In the methods of Examples 1 to 6 as the method of the present invention, although the number of polymerization is the same as or smaller than that in Comparative Example 1, the external surface of the porous anode is sufficiently coated with the conductive polymer and the inner spaces of the pores are sufficiently filled with the conductive polymer without sacrificing high frequency characteristics of the capacity and, therefore, the resulting electrolytic capacitor exhibits small leak current smaller in comparison with Comparative Example 1 and is superior in reliability.

Comparing Example 1 with Example 5, in Example 5, by inhibiting one of the monomer solution and the oxidizing agent solution introduced previously in the porous anode from diffusing into the other solution to be subsequently introduced in the case where the first conductive polymer is formed, the yield of the first conductive polymer is improved to about 20–60% of that in Example 1 and an electrolytic capacitor having high capacity even at high frequency range was obtained. However, coating of the external surface with the conductive polymer became insufficient and a capacitor with large leak current. Comparing Example 5 with Example 6, when the second conductive polymer portion was formed prior to the first conductive polymer portion, an electrolytic capacitor with small leak current and good characteristics was obtained regardless of small number of polymerization.

Comparing the methods of Examples 1 to 4 and Example 6 with that of Comparative Example 2, when a capacitor having the leak current value in the same level is produced, there could be confirmed such an effect that the number of the conductive polymer forming step to be repeated is very small according to the present invention.

TABLE 1

| | Capacity [µF] | | Leak current | Number of steps to be repeated | |
| | | | | First conductive | Second conductive |
| | 120 Hz | 100 Hz | [µA] | polymer portion | polymer portion |
| Example 1 | 148 | 88 | 0.113 | 10 | 10 |
| Example 2 | 150 | 89 | 0.108 | 10 | 5 |
| Example 3 | 152 | 91 | 0.081 | 10 | 5 |
| Example 4 | 150 | 90 | 0.092 | 10 | 5 |
| Comp. Example 1 | 135 | 81 | 15.8 | 20 | |

TABLE 1-continued

| | Capacity [μF] | | Leak current [μA] | Number of steps to be repeated | |
| --- | --- | --- | --- | --- | --- |
| | 120 Hz | 100 Hz | | First conductive polymer portion | Second conductive polymer portion |
| Comp. Example 2 | 150 | 88 | 0.26 | 40 | |
| Example 5 | 152 | 120 | 1.78 | 5 | 10 |
| Example 6 | 153 | 122 | 0.095 | 5 | 5 |

As described above, according to the method of producing an electrolytic capacitor of the present invention, the step of forming a first conductive polymer portion so in the inner spaces of the pores of the porous anode and the step of forming a second conductive polymer portion on the external surface of the porous anode are provided and a polymerization rate of a monomer in the step of forming the second conductive polymer portion is larger than that of a monomer in the step of forming the first conductive polymer portion, thereby making it possible to easily improve the properties of coating formed on the external surface of the porous anode. Therefore, it becomes possible to reduce the numbers of polymerization required to coat the external surface of the porous anode or fill the inner spaces of the pores with the conductive polymer, thereby making it possible to improve the productivity and to provide a capacitor with small leak current and high reliability.

What is claimed is:

1. A method of producing an electrolytic capacitor comprising a porous anode and a solid electrolyte made of a conductive polymer, said porous anode further comprising a porous body and a dielectric layer, said dielectric layer being formed on internal surfaces of a lot of pores of said porous body and an external surface of said porous body, and said conductive polymer being formed on the surface of said dielectric layer by a chemical oxidation polymerization method with a monomer and an oxidizing agent, said method comprising the steps of:

forming a first conductive polymer portion in inner spaces of a lot of pores of said porous anode; and forming a second conductive polymer portion on the external surface of said porous anode, wherein a polymerization rate of said monomer in the step of forming the second conductive polymer portion is larger than that of said monomer in the step of forming the first conductive polymer portion.

2. The method according to claim 1, wherein the first conductive polymer portion is formed after forming the second conductive polymer portion.

3. The method according to claim 1, wherein the step of forming the first conductive polymer portion comprises two stages, and the amount of the conductive polymer formed in the first stage is not more than 50% by volume of the amount of the conductive polymer formed in the whole pores of said porous anode, and subsequently the second conductive polymer portion is formed, furthermore, the rest of the first conductive polymer portion is formed in the pores of said porous anode in the second stage.

4. The method according to claim 1, wherein a concentration of said oxidizing agent in the step of forming the second conductive polymer portion is higher than that of said oxidizing agent in the step of forming the first conductive polymer portion.

5. The method according to claim 1, wherein a concentration of said monomer in the step of forming the second conductive polymer portion is higher than that of said monomer in the step of forming the first conductive polymer portion.

6. The method according to claim 1, wherein a polymerization temperature in the step of forming the second conductive polymer portion is higher than that in the step of forming the first conductive polymer portion.

7. The method according to claim 1, wherein the polymerization rate of said monomer in the step of forming the second conductive polymer portion is 2–12 times the polymerization rate of said monomer in the step of forming the first conductive polymer portion.

8. The method according to claim 1, wherein the step of forming the first conductive polymer portion further comprising the steps of:

(a) dipping said porous anode in one of said monomer solution and said oxidizing agent solution;

(b) dipping said porous anode in the other solution for a predetermined time; and (c) pulling up said porous anode from the solution and allowing said porous anode to stand outside the solution for a predetermined time.

9. The method according to claim 1, wherein the step of forming the second conductive polymer portion further comprising the steps of:

(a) dipping said porous anode in one of said monomer solution and said oxidizing agent solution;

(b) dipping said porous anode in the other solution for a predetermined time; and (c) pulling up said porous anode from the solution and allowing said porous anode to stand outside the solution for a predetermined time.

* * * * *